United States Patent [19]

Eguchi et al.

[11] Patent Number: 4,532,055
[45] Date of Patent: * Jul. 30, 1985

[54] RELEASING LUBRICANT FOR USE IN FORGING AND EXTRUSION PROCESSES

[75] Inventors: Kiyohisa Eguchi, Kawanishi; Norio Kitamura, Itami; George Ohta, Ikoma; Terumasa Okamura, Kashiwa; Seiji Yamada, Toyohashi, all of Japan

[73] Assignees: Agency of Industrial Science & Technology, Tokyo; Hanano Commerical Co., Ltd., Kobe; Taihei Chemical Industrial Co., Ltd., Osaka; Kabushiki Kaisha Gosei Kagaku Kenkyusho, Tokyo, all of Japan

[*] Notice: The portion of the term of this patent subsequent to Sep. 6, 2000 has been disclaimed.

[21] Appl. No.: 538,885

[22] Filed: Oct. 4, 1983

[30] Foreign Application Priority Data

Oct. 6, 1982 [JP] Japan ................................ 57-174493

[51] Int. Cl.$^3$ .............................................. C10M 1/50
[52] U.S. Cl. .................................. 252/28; 252/32.7 E; 252/49.6; 72/42
[58] Field of Search .................... 252/28, 32.7 E, 49.6; 72/42; 428/446

[56] References Cited

U.S. PATENT DOCUMENTS 3,840,461  8/1974  Espunes .............................. 252/28
4,260,498  7/1981  Sample et al. ...................... 252/28
4,402,838  9/1983  Eguchi et al. ...................... 252/28

*Primary Examiner*—Jacqueline V. Howard
*Attorney, Agent, or Firm*—Armstrong, Nikaido, Marmelstein & Kubovcik

[57] ABSTRACT

The present invention provides a releasing lubricant for use in forging and extrusion processes.

In one embodiment, the lubricant comprises a mixture of:

(a) at least one compound selected from the group consisting of phosphoric acid and its salts,
(b) at least one compound selected from the group consisting of boric acid and its salts,
(c) at least one compound selected from the group consisting of alkali metal carbonates, nitrates, sulfates and hydroxides, and
(d) a phyllosilicate, wherein the amounts of the compounds (a) to (c) (as oxides) are: 14 to 55 molar % of $P_2O_5$, 0 to 80 molar % of $B_2O_3$ and 30 to 80 molar % of $M_2O$ (M being an alkali metal) and the total amount of these compounds is 91 to 99.5 wt. % or 0.5 to 39 wt. % based on the solid.

In another embodiment, the amounts of the compounds (a) to (c) (as oxides) are: 14 to 39.5 molar % of $P_2O_5$, 0 to 80 molar % of $B_2O_3$ and 30 to 80 molar % of $M_2O$ (M being an alkali metal) and the total amount of these compounds is more than 39 wt. % but less than 91 wt. % based on the solid.

13 Claims, No Drawings

RELEASING LUBRICANT FOR USE IN FORGING AND EXTRUSION PROCESSES

BACKGROUND OF THE INVENTION

The present invention relates to a releasing lubricant for use in forging and extrusion processes having excellent releasing characteristics.

As releasing lubricants for use in forging and extrusion processes, there have been known mineral oil, a mixture of mineral oil with graphite and a mixture of graphite with water.

However, mineral oil has not only insufficient lubricating and releasing properties but also environmental and operational problems when used in a hot working, such as smoking, dust generation and fire hazard.

Graphite mixtures have lubricating and releasing properties superior to those of mineral oil but the above-mentioned environmental and operational problems have not yet been solved or overcome.

Further, there has been proposed a lubricant comprising a water-soluble glass containing $P_2O_5$, $B_2O_3$ and $M_2O$ (M being an alkali metal) and a phyllosilicate such as mica.

However, this lubricant has a defect that when it is put to use where great emphasis is laid on one of the lubricating and releasing properties at the sacrifice of the other property, either the releasing or the lubricating property becomes insufficient and, in an extreme case, seizure is caused, since the lubricant is intended to exhibit well-balanced lubricating and releasing properties in the forging or extrusion process.

SUMMARY OF THE INVENTION

An object of the present invention is to provide a new releasing lubricant having improved properties for use in forging and extrusion processes.

A second object of the invention is to provide a lubricant which does not cause an insufficient lubrication or release even when one of the lubricating and releasing properties is emphasized at the sacrifice of the other.

A third object of the invention is to provide a lubricant having excellent characteristics in that it exhibits a sufficient lubricating property and excellent spreading of the product when the lubricating property is particularly required, while it exhibits a sufficient releasing property without causing any seizure when the releasing property is particularly required.

A fourth object of the invention is to provide a lubricant free from the environmental pollution and defects in the operation of conventional lubricants, i.e. a lubricant causing no smoking nor dust generation even in a hot working.

PREFERRED EMBODIMENTS OF THE INVENTION

A releasing lubricant for use in forging and extrusion processes according to the first invention is a composition comprising:
(a) at least one compound selected from the group consisting of phosphoric acid and its salts,
(b) at least one compound selected from the group consisting of boric acid and its salts,
(c) at least one compound selected from the group consisting of alkali metal carbonates, nitrates, sulfates and hydroxides, and
(d) a phyllosilicate,
wherein the amounts of the compounds (a) to (c) (as oxides) are: 14 to 55 molar % of $P_2O_5$, 0 to 80 molar % of $B_2O_3$ and 30 to 80 molar % of $M_2O$ (M being an alkali metal) and the total amount of these compounds is 91 to 99.5 wt. % or 0.5 to 39 wt. % based on the solid.

A releasing lubricant for use in forging and extrusion processes according to the second invention is a composition comprising:
(a) at least one compound selected from the group consisting of phosphoric acid and its salts,
(b) at least one compound selected from the group consisting of boric acid and its salts,
(c) at least one compound selected from the group consisting of alkali metal carbonates, nitrates, sulfates and hydroxides, and
(d) a phyllosilicate,
wherein the amounts of the compounds (a) to (c) (as oxides) are: 14 to 39.5 molar % of $P_2O_5$, 0 to 80 molar % of $B_2O_3$ and 30 to 80 molar % of $M_2O$ (M being an alkali metal) and the total amount of these compounds is more than 39 wt. % but less than 91 wt. % based on the solid.

A mixture of the compounds (a) to (c) according to the present invention corresponds to a water-soluble glass. The water-soluble glass used in the first invention comprises (as oxides) 14 to 55 molar %, preferably 30 to 40 molar %, of $P_2O_5$, 0 to 80 molar %, preferably 3 to 7 molar % or 30 to 65 molar %, of $B_2O_3$ and 30 to 80 molar %, preferably 40 to 60 molar %, of $M_2O$ (M being an alkali metal; the same shall apply hereinafter).

When the amount of $P_2O_5$ is less than 14 molar %, the water-soluble glass components become insoluble in water, an aqueous suspension of the lubricant of the invention becomes alkaline and the suspension can hardly be applied to a mold. When the amount of $P_2O_5$ exceeds 55 molar %, an aqueous solution of the water-soluble glass components becomes highly acidic to corrode the workpiece and the mold.

When the amount of $B_2O_3$ exceeds 80 molar %, the $B_2O_3$ component is liberated from the aqueous solution of the water-soluble glass components to form a precipitate.

When the amount of $M_2O$ is less than 30 molar %, the aqueous solution of the water-soluble glass components becomes acidic to corrode the workpiece and the mold. When the amount of $M_2O$ exceeds 80 molar %, the aqueous solution becomes alkaline to corrode the workpiece and the mold as well.

The water-soluble glass used in the second invention comprises (as oxides) 14 to 39.5 molar %, preferably 14 to 20 molar %, of $P_2O_5$, 0 to 80 molar %, preferably 30 to 65 molar %, of $B_2O_3$ and 30 to 80 molar %, preferably 40 to 60 molar %, of $M_2O$.

When the amount of $P_2O_5$ exceeds 39.5 molar %, the viscosity of the lubricant is increased. This is not preferred in case the lubricating property is particularly required.

When the amounts of the components are not within the above-mentioned ranges, undesirable results as described above with reference to the first invention are obtained.

As the $P_2O_5$ source used in the first and the second inventions, there may be mentioned, for example, phosphoric acid or its salt such as sodium primary phosphate, potassium primary phosphate, sodium metaphosphate, sodium secondary phosphate, potassium secondary phosphate, sodium polyphosphate or potassium polyphosphate.

As the $B_2O_3$ source, there may be used, for example, boric acid or its salt such as sodium borate or potassium borate.

As the $M_2O$ source, there may be used an alkali metal carbonate, nitrate, sulfate or hydroxide such as sodium carbonate, potassium carbonate, sodium nitrate, potassium nitrate, sodium sulfate, potassium sulfate, sodium hydroxide or potassium hydroxide.

These compounds may be used in the form of powder, aqueous solution or dispersion.

As the phyllosilicates used in the first and the second inventions, there may be mentioned not only natural phyllosilicates but also synthetic phyllosilicates.

As the natural phyllosilicates, there may be used, for example, various kinds of mica such as muscovite $[KAl_2(AlSi_2O_{10})(OH)_2]$, paragonite $[NaAl_2(AlSi_3O_{10})(OH)_2]$, phlogopite $[KMg_3(AlSi_3O_{10})(OH)_2]$, biotite $[K(Mg,Fe)_3(AlSi_3O_{10})(OH)_2]$, lepidolite $[KLi_2Ag(Si_4O_{10})(OH)_2]$, zinnwaldite $(KLiFeAl(AlSi_3O_{10})(OH)_2]$, margarite $(CaAl_2(Al_2Si_2O_{10})(OH)_2]$; as well as kaolinite, halloysite, montmorillonite, vermiculite, illite, pyropyllite, talc or bentonite.

As the synthetic phyllosilicates, there may be used those known in the art, for example, lithium taeniolite $\{LiMg_2Li(X_4O_{10})F_2\}$ (where X is Si or Ge), sodium tetrasilicate mica $\{NaMg_{2.5}(Si_4O_{10})F_2\}$ or lithium or sodium hectorite $\{Li_{\frac{1}{3}}$ or $Na_{\frac{1}{3}}Mg_{2\frac{2}{3}}Li_{\frac{1}{3}}(Si_4O_{10})F_2\}$ disclosed in the specifications of Japanese Patent Publications Nos. 44758/1977, 29320/1978 and 20959/1978.

According to the present invention, the above-mentioned $P_2O_5$ source, $B_2O_3$ source and $M_2O$ source are mixed with the phyllosilicates. The amounts (molar %) of the compounds (as oxides) used as the $P_2O_5$, $B_2O_3$ and $M_2O$ sources should be in the above-mentioned ranges (molar %) and the total amount of these compounds on the solid basis should be 91 to 99.5 wt. %, preferably 95 to 99.5 wt. %, when the lubricating property is particularly required and 0.5 to 39 wt. %, preferably 0.5 to 20 wt. %, when the releasing property is particularly required.

When the total amount of these compounds is less than 91 wt. %, the lubricating property becomes insufficient even if it is particularly required, resulting in poor spreading of the product. When the total amount exceeds 99.5 wt. %, the glass deposits in a depression and a scale deposits on the glass deposit to cause underfill of the product in case the mold has a complicated shape.

When the total amount of these compounds is less than 0.5 wt. %, the lubricating property is hardly recognized and no lubricating effect can be obtained.

When the total amount of these compounds exceeds 39 wt. %, the releasing property becomes insufficient even if it is particularly required. In an extreme case, seizure is caused.

Since the total amount of the compounds used as the $P_2O_5$, $B_2O_3$ and $M_2O$ sources is within the above-mentioned range, the amount of the phyllosilicate is 0.5 to 9 wt. % or 61 to 99.5 wt. % based on the solid in the first invention.

In the second invention, the amounts (molar %) of the compounds used as the $P_2O_5$, $B_2O_3$ and $M_2O$ sources are within the above-mentioned ranges and the total amount of these compounds is more than 39 wt. % and less than 91 wt. %, preferably in the range of 40 to 70 wt. % based on the solid. When the total amount is 39 wt. % or less, the lubricating property is insufficient. When the total amount exceeds 91 wt. %, the releasing property becomes unsatisfactory and seizure is caused in an extreme case.

Accordingly, the amount of the phyllosilicate in the second invention is less than 9 wt. % or more than 61 wt. % based on the solid.

The lubricant of the present invention may be used as a powdery mixture or diluted with water or another solvent. Generally, the lubricant is used in the form of 10 to 25% aqueous suspension. The suspension may further be diluted to a concentration of at least 1/50.

Thus, according to the first or the second invention, the following effects can be obtained by using 14 to 55 molar % (as oxide) of $P_2O_5$ and the above-mentioned amounts (molar %) of $B_2O_3$ and $M_2O$ and limiting the total amount of these compounds to 91 to 99.5 wt. % or 0.5 to 39 wt. % based on the solid (the first invention) or by using 14 to 39.5 molar % of $P_2O_5$ and the above-mentioned amounts (molar %) of $B_2O_3$ and $M_2O$ and limiting the total amount of these compounds to more than 39 wt. % and less than 91 wt. % based on the solid (the second invention):

(1) When the lubricant of the present invention is used in a hot working process, no smoking nor dust generation is caused at all. Therefore, environmental and operational problems can be reduced remarkably as compared with the case where mineral oil is used.

(2) The lubricant of the present invention does not cause underfill or seizure due to the deposition of the lubricating oil at the forging or extrusion temperature of about 200° to 1300° C. Therefore, the environmental and operational defects of the lubricants used in the prior art can be overcome.

(3) As compared with conventional lubricants, the lubricants of the first and the second inventions have a far broader range of the composition containing $P_2O_5$, $B_2O_3$ and $M_2O$. Accordingly, the varieties of metallic materials to which the lubricant can be applied and working processes can be broadened markedly.

(4) The lubricants obtained by conventional processes have well-balanced lubricating the releasing properties. On the contrary, the lubricant of the first invention has a controlled composition of 91 to 99.5 wt. % or 0.5 to 39 wt. %, based on the solid content, of the total of the salts of the compounds or glass containing the above-mentioned amounts (molar %) (as oxides) of $P_2O_5$, $B_2O_3$ and $M_2O$. Therefore, the properties of the lubricant can be modified so as to satisfy a requirement when either the lubricating property or the releasing property is particularly required.

The following examples will further illustrate the present invention.

EXAMPLES 1 to 6

Starting compounds, i.e. sodium phosphate, boric acid and sodium hydroxide or potassium hydroxide were mixed together in such a manner that the amounts (molar %) (as oxides) of $P_2O_5$, $B_2O_3$ and $Na_2O$ or $K_2O$ would be as shown in Table 1 given below and the total amount of them (wt. % based on the solid) would be as shown in the same table. The mixture was fused by heating to 100° C. for 30 min and then cooled rapidly on an iron plate. The resulting glass or crystalline product was dissolved in water to obtain a 20 wt. % aqueous solution. The solution was then mixed with a phyllosilicate in an amount (wt. % based on the solid) as shown in Table 1 to obtain a suspension of the salt in the aqueous solution (Sample Nos. 1 to 6). The suspension was diluted to a concentration of 20% and used as the lubricant. Performance evaluation tests were effected using an extrusion press. The results are shown in Table 1 together with the results of comparative examples.

Test conditions:
extruder: Ube extruder 1500 $ 6", 2350 $ 8½".
mold temperature: dummy 380° C., container 400° to 450° C.
material: aluminum alloy 6063.
product: aluminum sash.
material-heating temperature: 500° C.
processing temperature: 450° to 480° C.

TABLE 1

| Compound mixture | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| Synthetic mica *1 | | 100 | 100 | | | 200 | | 100 |
| Sericite *2 | 200 | | | | 200 | | | |
| Bentonite | | | | 200 | | | 100 | |
| $P_2O_5$ 33.3 molar %, $Na_2O$ 66.7 molar % | | | | | 20 | | | |
| $P_2O_5$ 26.5 molar %, $Na_2O$ 67.5 molar %, $B_2O_3$ 6 molar % | 10 | | | 20 | | | | |
| $P_2O_5$ 21.3 molar %, $K_2O$ 64.2 molar %, $B_2O_3$ 14.5 molar % | | | 50 | | | | | |
| $P_2O_5$ 14 molar %, $K_2O$ 21 molar %, $B_2O_3$ 65 molar % | | 30 | | | | | | |
| $P_2O_5$ 41.2 molar %, $K_2O$ 12.5 molar %, $Na_2O$ 39.3 molar %, $B_2O_3$ 7 molar % | | | | | | 10 | 100 | 250 |

*1 composition: $Na_{0.6-0.8}Mg_{2.6-2.7}(Si_4O_{10})F_2$
*2 composition: $KAl_2(AlSi_3O_{10})(OH)_2$
*3 The numerals represent parts by weight of the components Test method and results:

Each of lubricants (suspensions) of Examples 1 to 6 and Comparative Examples 1 and 2 having the compositions shown in Table 1 was sprayed on a mold. Sticking, underfill, lubricating property and releasing property of the sample were examined. The lubricating properties were: Comparative Example 1>Comparative Example 2>>Example 2>Example 3>Example 4>Example 1>Example 6>Example 5 and the releasing properties were: Example 1>Example 4>Example 3>Example 2>Example 6>Example 5>>Comparative Example 1>Comparative Example 2: The determination methods were as follows:

lubricating property: spreading of the product, seams, shapes of corners and fins
releasing property: number of times of application, sticking and release of dummy block.

It is apparent from the above results that the particularly excellent releasing properties were obtained in Examples 1 to 6. For example, the extrusion time was 5 in Example 1, while the application of the lubricant was required each time in Comparative Example 1. Defects such as sticking were observed in Comparative Example 2.

EXAMPLES 7 to 9

The lubricating and releasing properties of an aqueous solution of a lubricant having the composition shown in Table 2 given below were examined under the following conditions:

Test conditions:
machine: Eumco 3150 t press
product: connecting rod
material-heating temperature: 1000° to 1100° C.
working temperature: 900° to 1000° C.
mold temperature: 170° to 220° C.
material: S-55C
dilution: 1/25.

Results:

The lubricating properties were: Comparative Example 3>Example 7>Example 8>Example 9>Comparative Example 5>Comparative Example 4. The releasing properties were: Comparative Example 4>Comparative Example 5>Example 9>Example 8>Example 7>>Comparative Example 3.

It is apparent from the above results that the lubricant of Comparative Example 3 had a particularly excellent lubricating property but it cannot be used when the releasing property is also required, since it has no releasing property at all. Among the practically usable lubricants, both excellent lubricating and releasing properties were obtained in Examples 7, 8 and 9.

TABLE 2

| Compound mixture | Ex. 7 | Ex. 8 | Ex. 9 | Comp. Ex. 3 | Comp. Ex. 4 | Comp. Ex. 5 |
|---|---|---|---|---|---|---|
| Synthetic mica *1 | 2.5 | | | | 30 | |
| Sericite *2 | | 5 | | | | |
| Bentonite | | | 8 | | | 8 |
| $P_2O_5$ 41 molar %, $Na_2O$ 30 molar %, $K_2O$ 22 molar %, $P_2O_3$ 7 molar % | 95 | 90 | 90 | 100 | 70 | |
| $P_2O_5$ 60 molar %, $K_2O$ 30 molar %, $B_2O_3$ 10 molar % | | | | | | 90 |
| Water | 903 | 885 | 882 | 900 | 900 | 882 |

Symbols *1 to *3 have the same meaning as in Table 1.

EXAMPLES 10 and 11

A lubricant having a composition shown in Table 3 was diluted to form a 10% suspension. The performance evaluation tests were effected under the following conditions:

machine: drop machine 8
product: blades for blowers (450×100×5 t)
material-heating temperature: 1000° C.
mold temperature: 170° C.
material: SKT-4
application method: brushing of the stock solution.

Though the mold temperature was as low as shown above, the adhesion was improved by using the lubricant having the composition of Example 10 or 11. Excellent lubricating and releasing properties were obtained. However, in Comparative Examples 6 and 7, the lubricant had a high viscosity and, therefore, the adhesion to the mold was poor; and the lubricating property was seriously reduced and the sticking was observed.

TABLE 3

| Compound mixture | Ex. 10 | Ex. 11 | Comp. Ex. 6 | Comp. Ex. 7 |
|---|---|---|---|---|
| Synthetic mica *1 | 100 | | 100 | 100 |
| Sericite *2 | | | | |
| Bentonite | | 100 | | |
| $P_2O_5$ 42 molar %, $Na_2O$ 29 molar %, $K_2O$ 29 molar % | 160 | | | |
| $P_2O_5$ 37 molar %, $Na_2O$ 27 molar %, $K_2O$ 34 molar % $B_2O_3$ 2 molar % | | 100 | | |
| $P_2O_5$ 41.2 molar %, $Na_2O$ 51.8 molar %, $B_2O_3$ 7 molar % | | | 160 | |
| $P_2O_5$ 41.2 molar %, $K_2O$ 12.5 molar %, $Na_2O$ 39.3 molar %, $B_2O_3$ 7 molar % | | | | 100 |

Symbols *1 to *3 have the same meaning as in Table 1.

EXAMPLES 12 and 13

A lubricant having a composition shown in Table 4 was diluted to form a 10% suspension. The performance evaluation tests of the suspension were effected under the followng conditions:

Test conditions:
machine: Ube 1800 $ double acting press
product: pipe
material-heating temperature: 900° to 950° C.
working temperature: 850° C.
material: copper alloy (64–36)
billet size: 185φ×500L
extruded tube size: 71φ×60.55φ×L
application method: the stock solution was sprayed on the inner walls of the mandrel container and the die.

Test results:

In both Examples 12 and 13, no foaming was observed on the product surface and no seizure on the bearing surface nor the surface scar was recognized. However, in Comparative Examples 6 and 7, the scar in the extrusion direction and seizure were observed on the surface of the product. In Comparative Examples 6 and 7, foaming was caused on the surfaces in the second and subsequent products and they became unusable.

TABLE 4

| Compound mixture | Ex. 12 | Ex. 13 | Comp. Ex. 6 | Comp. Ex. 7 |
|---|---|---|---|---|
| Synthetic mica *1 | 100 | | 100 | 100 |
| Sericite *2 | | 100 | | |
| Bentonite | | | | |
| $P_2O_5$ 41.2 molar %, $Na_2O$ 51.8 molar %, $B_2O_3$ 7 molar % | | | 160 | |
| $P_2O_5$ 41.2 molar %, $K_2O$ 12.5 molar %, $Na_2O$ 39.3 molar %, $B_2O_3$ 7 molar % | | | | 100 |
| $P_2O_5$ 15 molar %, $K_2O$ 26 molar %, $B_2O_3$ 59 molar % | 100 | | | |
| $P_2O_5$ 45 molar %, $K_2O$ 30 molar %, $B_2O_3$ 25 molar % | | 140 | | |

Symbols *1 to *3 have the same meaning as Table 1.

What is claimed is:

1. A releasing lubricant for use in forging and extrusion processes which comprises a mixture of:
   (a) at least one compound selected from the group consisting of phosphoric acid, metaphosphoric acid, polyphosphoric acid, and sodium and potassium salts thereof,
   (b) at least one compound selected from the group consisting of boric acid, sodium borate and potassium borate,
   (c) at least one compound selected from the group consisting of alkali metal carbonates, nitrates, sulfates and hydroxides, and
   (d) a phyllosilicate,
wherein the amounts of the compounds (a) to (c) are: 14 to 55 molar % of $P_2O_5$, 0 to 80 molar % of $B_2O_3$ and 30 to 80 molar % of $M_2O$, and the total amount of these compounds is 91 to 99.5 wt. % or 0.5 39 wt. % based on the solid.

2. A releasing lubricant for use in forging and extrusion processes according to claim 1, wherein the amount of the compound (a) (as oxide) is 30 to 40 molar %.

3. A releasing lubricant for use in forging and extrusion processes according to claim 1, wherein the amount of the compound (b) (as oxide) is 3 to 7 molar %.

4. A releasing lubricant for use in forging and extrusion processes according to claim 1, wherein the amount of the compound (c) (as oxide) is 40 to 60 molar %.

5. A releasing lubricant for use in forging and extrusion processes according to claim 1, wherein the total amount of the compounds (a), (b) and (c) is 95 to 99.5 wt. % based on the solid.

6. A releasing lubricant for use in forging and extrusion processes according to claim 1, wherein the total amount of the compounds (a), (b) and (c) is 0.5 to 20 wt. % based on the solid.

7. A releasing lubricant for use in forging and extrusion processes according to claim 1, wherein the compounds (a) to (d) are suspended in water.

8. A releasing lubricant for use in forging and extrusion processes which comprises a mixture of:
   (a) at least one compound selected from the group consisting of phosphoric acid, metaphosphoric acid, polyphosphoric acid, and sodium and potassium salts thereof,
   (b) at least one compound selected from the group consisting of boric acid, sodium borate and potassium borate,
   (c) at least one compound selected from the group consisting of alkali metal carbonates, nitrates, sulfates and hydroxides, and
   (d) a phyllosilicate, wherein the amounts of the compounds (a) to (c) are: 14 to 39.5 molar % of $P_2O_5$, 0 to 80 molar % of $B_2O_3$ and 30 to 80 molar % of $M_2O$, and the total amount of these compounds is more than 39 wt. % but less than 91 wt. % based on the solid.

9. A releasing lubricant for use in forging and extrusion processes according to claim 8, wherein the amount of the compound (a) as oxide is 14 to 20 molar %.

10. A releasing lubricant for use in forging and extrusion processes according to claim 8, wherein the amount of the compound (b) as oxide is 30 to 65 molar %.

11. A releasing lubricant for use in forging and extrusion processes according to claim 8, wherein the amount of the compound (c) as oxide is 40 to 60 molar %.

12. A releasing lubricant for use in forging and extrusion processes according to claim 8, wherein the total amount of the compounds (a) to (c) is 40 to 70 wt. % based on the solid.

13. A releasing lubricant for use in forging and extrusion processes according to claim 8, wherein the compounds (a) to (d) are suspended in water.

* * * * *